Aug. 20, 1946.  H. J. BENEKE  2,406,280
HOE
Filed Aug. 13, 1942
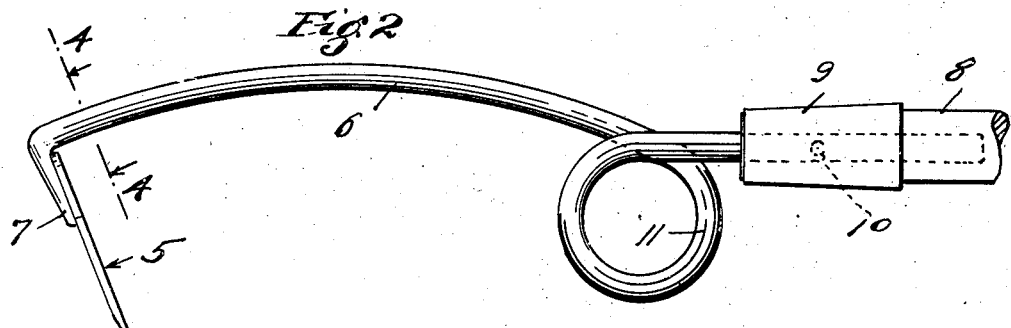
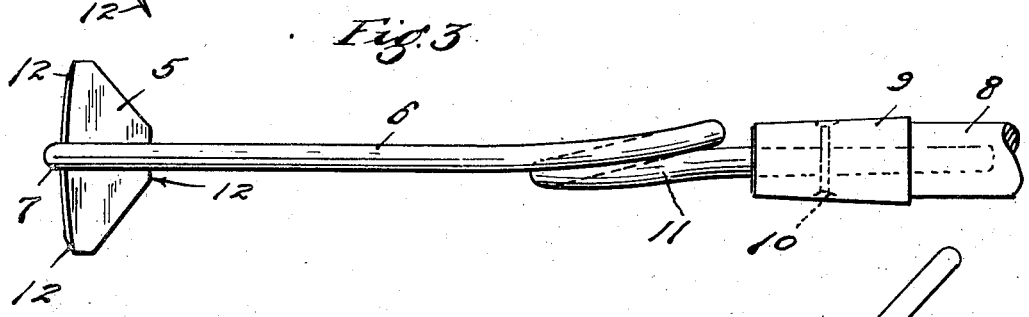
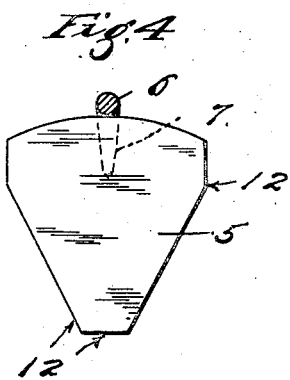
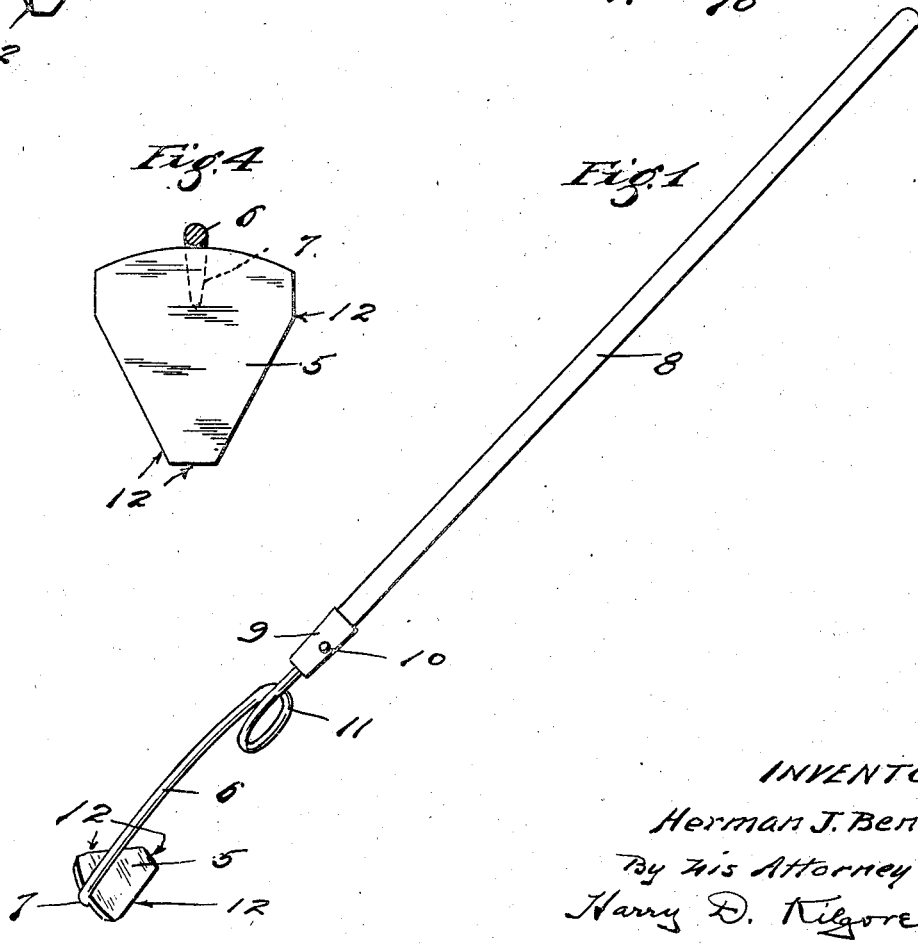
INVENTOR
Herman J. Beneke
By his Attorney
Harry D. Kilgore Patented Aug. 20, 1946

2,406,280

UNITED STATES PATENT OFFICE 2,406,280

HOE

Herman J. Beneke, Faribault, Minn.

Application August 13, 1942, Serial No. 454,738

1 Claim. (Cl. 97—71.1)

My present invention relates to improvements in hoes.

The object of the invention is to provide a hoe having its shank bent to form a spring to absorb shocks, blows and vibrations produced when hoeing, and thereby relieve the operator's arms from tiring strains produced when using an ordinary hoe having a rigid shank.

To the above end, the invention consists of the novel construction and arrangement of parts hereinafter described and defined in the claim.

In the accompanying drawing, which illustrates the invention, like characters indicate like parts throughout the several views.

Referring to the drawing:

Fig. 1 is a perspective view of a hoe having the invention embodied therein;

Fig. 2 is an elevation of the improved hoe with a portion of the handle broken away, on an enlarged scale;

Fig. 3 is a plan view of the hoe shown in Fig. 2; and

Fig. 4 is a view partly in elevation and partly in section taken on the line 4—4 of Fig. 3.

The numeral 5 indicates the blade of the improved hoe, which as shown, has substantially the same contour as one of the sickle knives in a mowing machine. A long shank 6 in the form of a round metal rod is rigidly secured at one of its end portions to the blade 5, as indicated at 7. The shank 6, at its other end portion, is inserted into a long bore in one end of a handle 8, having thereon a ferrule 9. A rivet 10, extending through aligned transverse holes in the ferrule 9, handle 8 and shank 6 rigidly and securely connects the shank 6 to the handle 8.

The shank 6, which, as shown, is arched, is bent at its inner end portion to form a coiled spring 11 that lies in a vertical plane when the hoe is positioned as shown in Fig. 2.

The purpose of the spring 11, is to relieve the operator's arms from shocks, strains and vibrations while manipulating the hoe during hoeing operation.

The hoe blade 5, as shown, has three cutting edges, as indicated at 12, and these cutting edges are ground sharp. While the hoe may be used as a warren hoe, it is especially intended to be used with a sweeping movement in which one of its longitudinal edges 12 is drawn through the soil with a cutting action, instead of a chopping action as used in the ordinary garden hoe. This sweeping action while hoeing lends itself to very fast and efficient work and leaves the soil loose and relatively smooth.

The spring 11 not only permits the shank 6 to yield longitudinally, but it will also permit substantially universal relative transverse yielding movements of the hoe blade 5 and the handle 8. This relative yielding movement of the hoe blade 5 and the handle 8 relieves the operator's arms from tiring strains produced when using an ordinary hoe having a rigid shank.

When using the hoe positioned as shown in Fig. 1, or in other words, when the lower longitudinal cutting edge of the blade is resting on the ground, and the blade forwardly inclined from the operator, said blade, under pulling action of the hoe toward the operator, will draw itself into the ground. This operation of the hoe eliminates the customary chopping action required when using the ordinary garden hoe.

What I claim is:

A hand hoe comprising a blade having a transverse bottom cutting edge and side cutting edges that diverge upwardly from the ends of the bottom cutting edge, a handle, and a shank connecting the central portion of the blade to the handle, said shank being bent to form a vertically disposed coiled spring, said spring permitting relative movement of the end portions of the shank in a vertical plane when the bottom cutting edge of the blade is being used, the central mounting of said spring also permitting lateral angular movement of the outer end portion of the shank relative to the inner end portion thereof when either one of the side cutting edges of the blade is being used.

HERMAN J. BENEKE.